Oct. 8, 1935.  R. R. ELSTON  2,016,419

SANDER FOR MOTOR VEHICLES

Original Filed Jan. 15, 1932   2 Sheets-Sheet 1

Inventor
Rue R. Elston
By
Attorney

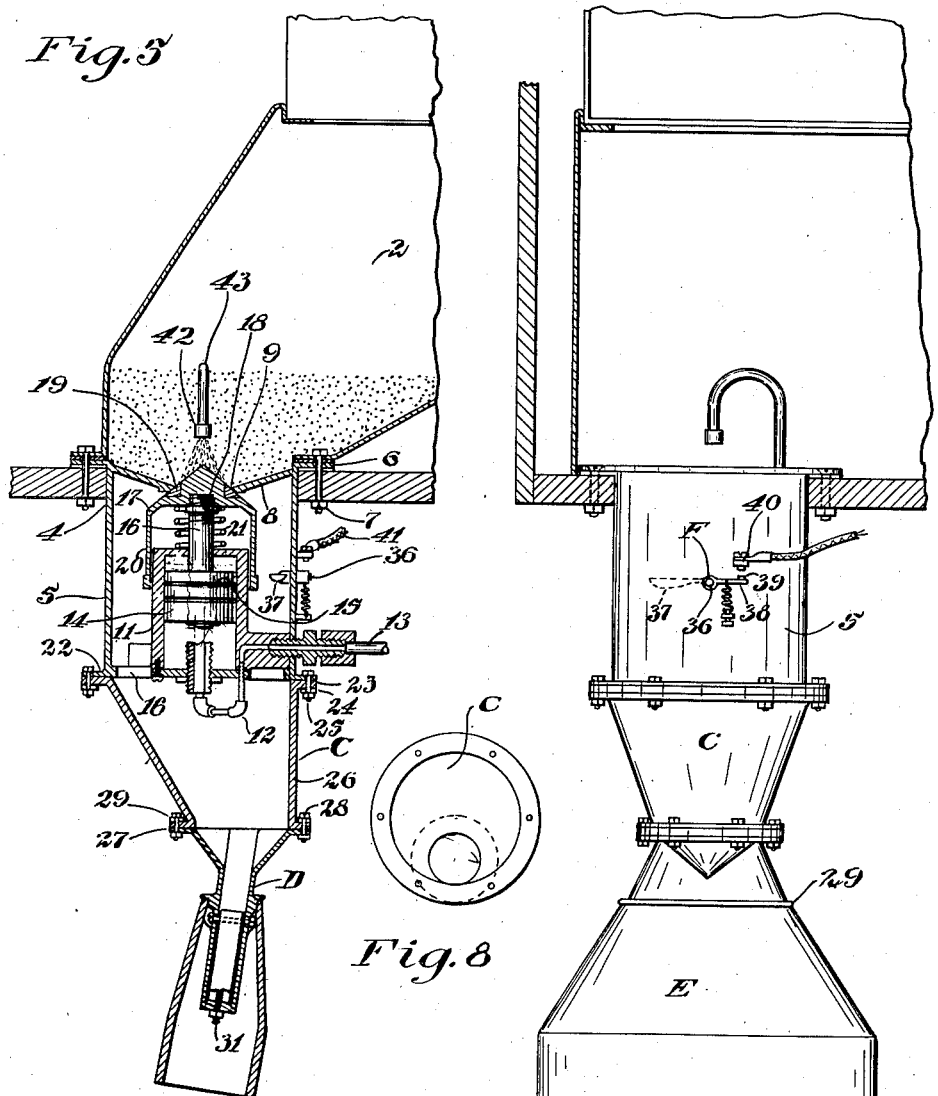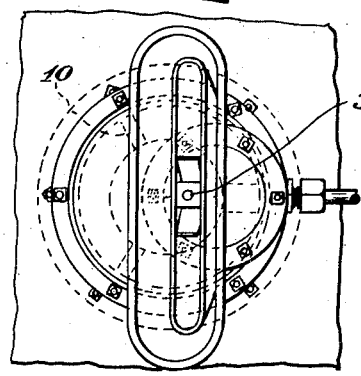

Patented Oct. 8, 1935

2,016,419

UNITED STATES PATENT OFFICE 2,016,419

SANDER FOR MOTOR VEHICLES

Rue R. Elston, Minneapolis, Minn.

Application January 15, 1932, Serial No. 586,844
Renewed February 21, 1935

7 Claims. (Cl. 291—36)

The present invention relates to a sander which is particularly adapted for use with trackless motor vehicles, such as buses.

Motor bus operators are faced with a very grave hazard when weather or other conditions require travel over slippery streets. A motor bus is a large, heavy vehicle, carries many passengers, and, when one gets out of control, due to loss of traction through skidding, great damage may ensue to human life and property. Various types of anti-skid tires have been created and accessory devices such as chains and lugs have been tried in an effort to overcome skidding, and while many of these devices are a great improvement over a plain type of tire tread, there has been found only one really satisfactory solution to the problem of preventing skidding and that is sand. Sand spread under the tires will give traction on practically any surface over which a bus may travel.

Many types of sanders have been developed in the past, especially for vehicles operating on tracks such as railway trains or street cars. The devising of a suitable sander for such vehicles is a comparatively simple matter compared to the devising of one for a trackless vehicle, which may have to plow through deep mud, slush, and snow; through dust and tar covered streets, and still must be ready to function without fail when an emergency requiring its use arises.

One type of sander which has overcome many of the difficulties inherent in the design of sanders is shown in my Patent No. 1,812,521, dated June 30, 1931.

An object of the present invention is to make an improved sander for trackless vehicles such as motor buses.

In order to attain this object, there is provided, in accordance with one feature of my invention, a sand compartment mounted on a body member of a motor bus and having a valve therein which is protected from the action of sand passing therethrough. A signal device placed in the path of sand flowing through the device indicates to the driver when the mechanism is operating. A spreader is provided to spread the sand when falling to bring it under the dual tires of the bus, when the bus is equipped with dual tires, and a flexible, resilient boot is mounted around the discharge orifice of the device to prevent crusting of deposits of mud, ice, or other substance which have heretofore seriously interfered with the successful functioning of sanders of this general type.

The discharge spreader, or nozzle, as it might be called, is suspended from the valve housing by a resilient offset sleeve which permits a limited flexibility of the nozzle and also permits accurate adjustment of the nozzle's position with respect to the bus wheels.

These, and other features of the invention, will be more fully brought out later in this specification and in the accompanying drawings, wherein:

Figure 5 is a vertical, longitudinal, sectional view on the line 5—5 of Figure 3.

Figure 6 is a front view of the device, a portion of a sand hopper being broken away.

Figure 7 is a view taken from below, a fragment of the bus floor being shown; and Figure 8 is a plan view of a resilient, offset sleeve for supporting the spreader nozzle from the valve housing.

Figure 1:
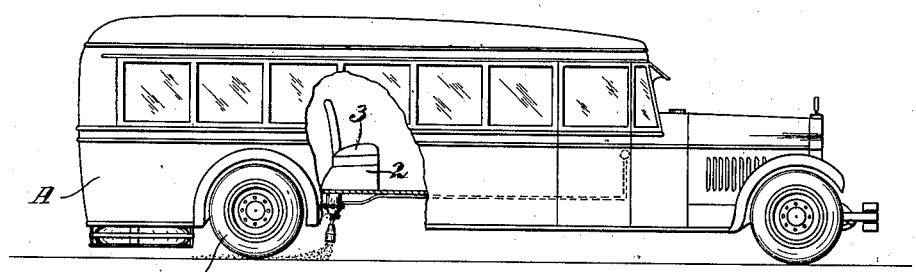
Figure 1 is a view in side elevation of a motor bus equipped with a sander embodying the present invention, a portion of a side of the bus body being broken away.
Figure 2:
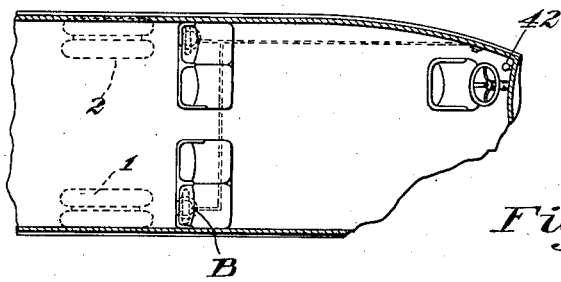
Figure 2 is a horizontal sectional view of a portion of a bus body showing generally the location of the sanders and the control wiring therefor.
Figure 3:
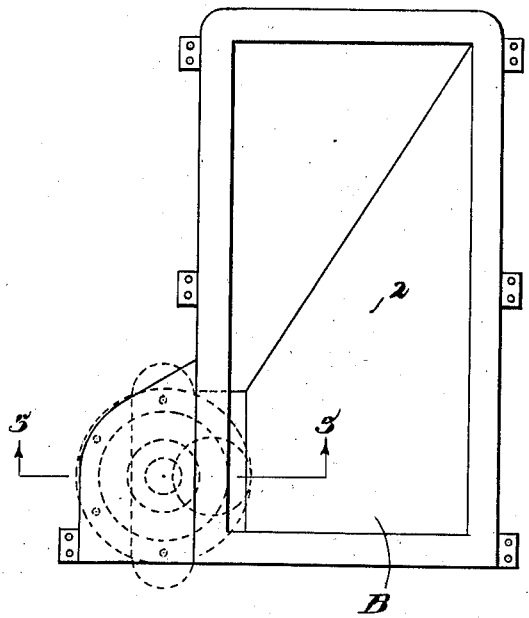
Figure 3 is a plan view of a sand hopper, with cover removed, the sander being indicated in dotted lines.

Referring to the drawings in detail, a bus A is shown as of a conventional type, having dual tired drive wheels 1 and 2. A sander B is mounted in front of each drive wheel. Sand hoppers 2 are constructed beneath seats 3 just forwardly of the drive wheels. The bottom of each of these hoppers slopes toward an opening 4 in the bus floor, directly in front of the drive wheels. Supported in each of these openings is a valve housing 5, as shown in Figures 5 and 6. Each of these valve housings has a radially projecting flange 6 around the upper end thereof to rest on the bus floor around the opening therein, and is secured in place, and to the hopper 2, by bolts 7. A conically concave top member 8 is formed integrally with the sides of the housing and is provided with a central valve opening 9. A spider 10 is secured across the lower end of the valve housing 5 and upon this spider is secured a valve cylinder 11 (see Figure 5). An air suction line 12 is in open communication with the interior of the valve operating cylinder 11 and is connected, by suitable piping 13, to an evacuating means, such as a vacuum pump, not shown, or to the intake manifold of the bus motor, also not shown, in a well known manner. A piston 14 is slidably mounted in the cylinder and is preferably provided with sealing rings 15, of a conventional type, to form a substantially air-tight seal with the cylinder walls. A connecting rod 16 extends upwardly from the piston 14, and through an opening in the cylinder head, to have a sliding fit therein. A valve head 17 is threadedly mounted on the upper end of the rod 16 and may be secured against loosening by a locknut 18. The valve head has a conical, convex upper surface with an annular groove therein in which an annular rubber washer 19 is mounted to engage the valve seat so as to insure a more effective sealing of the sand on closing the valve, and to reduce wear between the valve and its seat which would be considerably greater if the contact surfaces of both parts were of metal. A skirt 20 depends from the periphery of the valve head and may be formed integrally therewith, as shown. This skirt is of a diameter to receive the valve cylinder 11 freely therein, as shown in Figure 5, and effectively prevents falling sand from entering the valve operating mechanism.

A coil spring 21 encircles the connecting rod 16 and is held in compression between the cylinder head and the valve head to normally close the valve.

A radially disposed flange 22 is provided circumferentially of the lower edge of the valve housing 5 and an offset sleeve C of tough, resilient material, such as vulcanized rubber, is secured to this flange, as follows. The sleeve C has a circular open upper end provided with a radially disposed flange 23 to coincide with the lower valve housing flange 22. A plurality of equally spaced holes, here shown as six, is provided in both the flanges 22 and 23 and a metal ring 24 provided with six similar holes is placed below the sleeve flange 23 and the whole bolted together by bolts 25. The sleeve also has a circular open lower end parallel to the plane of the upper end thereof, but laterally offset therefrom so that one side 26 thereof (see Figure 5) is substantially perpendicular to the planes of both ends, while the other sides of the sleeve slope inwardly from the upper to the lower end as shown. A spreader nozzle D is provided with an annular radially disposed upper flange 27, which is provided with bolt holes and is secured to the flanged lower end of the sleeve C by bolts 28 and a metal retaining ring 29, as above described, for securing the upper end of the sleeve. While resilient vulcanized rubber is set forth as one suitable material of which to make this sleeve, other resilient or, semi-resilient materials, such as fabric or wire imbedded in rubber, or spring wire woven into a fabric material, or leather, would be suitable.

Figure 4:
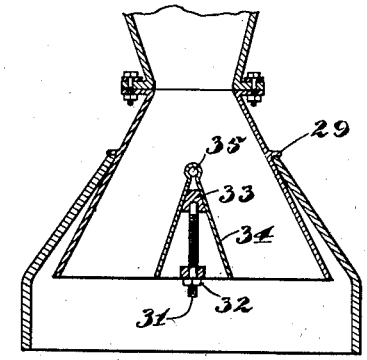
Figure 4 is a vertical, transverse, sectional view of a spreader nozzle with a flexible boot mounted thereon, and shows the lower portion of a flexible support member.

The spreader nozzle is preferably formed with substantially parallel front and rear walls and with laterally diverging side walls, as shown, and is provided with an encircling flange or bead 29 to retain a rubber boot E in position thereon. A bar 30 is fixedly secured transversely of the bottom opening of the nozzle and in this bar is threadedly mounted an adjusting screw 31 (see Figure 4) having a locknut 32 below the bar 30 to lock the screw 31 in adjusted position. The upper end of the adjusting screw is mounted to turn freely in a wedge-shaped spreader block 33, which in turn is mounted between the sides of an inverted V-shaped spreader vane 34 of spring sheet metal. The upper end of the spreader vane is formed to encircle a positioning pin 35 which is mounted longitudinally of the nozzle. Moving the spreader block upwardly by means of the adjusting screw 31 diverges the vanes 34, and conversely, lowering it permits the vanes, which are formed of spring metal and are normally set to lie in closely adjacent position, to converge. The resilient boot E is preferably moulded from resilient vulcanized rubber, or other suitable material, with the upper end thereof of a size which will permit it to be slipped on over the upper end of the nozzle D and downwardly over the bead 29 to have a close fit around the nozzle below the bead. When in this position the diverging sides of the nozzle hold the boot against downward displacement and the bead 29 retains it against upward displacement.

A signal operating switch F (see Figures 5 and 6) is provided in the wall of the valve housing 5 and comprises a pivot pin 36 with a spoon shaped arm 37 mounted in the path of sand flowing downwardly through the valve housing during an operative period of the sander. Exteriorly of the housing 5 a switch arm 38 is affixed to the pivot pin 36 and carries on its outer end a contact point 39. A second contact point 40 is supported on the housing, but is insulated from it and this second contact point is connected by a conductor 41 to a signal such as a lamp 42 (see Figure 1) placed within sight of the driver and thence to the bus battery. The housing 5 is grounded to the metal frame of the car, as by means of the metal pipe 13 and as the other terminal of the battery, not shown, is also grounded in a conventional manner, a circuit is completed through the signal upon each operation of the switch F, caused by a functioning of the sander. By this arrangement the driver can test the device when road conditions indicate the possibility of a skid so as not to depend on the sander in case it should be empty or otherwise not functioning.

An air valve, not shown, of a conventional type, either mechanically or electrically operated, is used to operate the sand valve 17 and is placed so as to be within convenient reach of the driver.

An air nozzle 42 is mounted on a goose neck pipe 43 directly above the sand valve 17 and pointing toward it. This pipe is connected to a supply of compressed air, such as a tank, not shown, mounted on the bus in a convenient location and kept charged by an air compressor, also not shown, in a well known manner. The pipe 43 is connected through a valve, not shown, adjacent the one which operates the sand valve piston 14 so that both the suction and the pressure valves will be operated simultaneously to produce a blast of air from the nozzle 42 during operation of the sand valve. This air blast agitates the sand over the valve tending to blow the sand through the open valve and prevents clogging in case such a tendency were present, due to dampness or dirty sand.

*Operation*

The sand hoppers and valve housing and associated parts, except the sleeve C and similar nozzle assembly, are mounted on the bus, as above described, and illustrated in the accompanying drawings. The sleeve C is then adjusted on the flange 22 so that the lower circular end of said sleeve lies directly in front of the wheels it is intended to serve. The ring 24 is then placed in position and the bolts 25 are inserted and tightened.

The nozzle D with the flexible boot E in position thereon is then bolted to the lower end of the sleeve C so that the long dimension of the nozzle lies transversely of the bus.

Sand is then placed in the hopper 2 and the device is operated to release sand which, passing downwardly therethrough, is deflected by the vanes 34. The separation of the vanes is then adjusted as hereinbefore described to give the required spread to the stream of sand, and the device is ready for use.

Instead of the suction line below the piston 14 to operate the sand valve, a pressure line may be substituted therefor, entering the cylinder 11 above the piston and operated from the same source of compressed air as that used for the air nozzle 42. If this method of operating the sand valve were used a packing gland of any well known type would be provided in the cylinder head around the rod 16 to prevent escape of air at this point. This modification is not illustrated as it would be easily within the ability of an ordinary mechanic to embody it in the construction, and, further, it forms no material part of the present invention. It is, therefore, suggested merely as a possibly desirable alternative because most present day buses are equipped with air brakes requiring compressed air for their operation and this supply of compressed air may thus be readily used to operate the sand valve.

The mechanism is simple and rugged in construction and positive in operation, the flexible sleeve C permitting a relative movement of the nozzle with respect to the valve housing 5 in case of striking an obstruction which would break off a rigidly supported nozzle. The boot is a particularly valuable feature of the invention, since, due to its flexibility it is in a continuous state of bending and vibrating movement at all times when the bus is in motion which effectively prevents the forming of an incrustation of mud or ice thereon. Also it acts as a cushion in case of impact by rocks which are sometimes picked up between the tires of a dual tired wheel, and, when the bus is traveling at high speeds these rocks when freed are released at a velocity tangentially to the wheel sufficient to break a light metal casing such as that used for the nozzle. A still further advantage lies in the fact that the lower edge of the boot may be mounted much closer to the road than could a rigid nozzle, since obstructions striking the flexible boot cannot materially injure it and this feature permits discharging the sand when close to the road where the falling stream of sand is less affected by air currents and a greater proportion of the sand released finds its way beneath the wheels.

The method of securing the sleeve C to the valve housing, and the nozzle D to the sleeve, is believed to be one of the features of the invention, since, in addition to the clamping action of the metal rings 24 and 29, which tightly clamp the flanges of the sleeve to their respective metal supporting flanges, the penetration of the sleeve by the securing bolts prevents separation of the sleeve from its metal supporting flange unless the sleeve material is literally torn loose from the bolts.

I claim:

1. A sander for wheeled motor road vehicles, comprising a sand hopper, a sand valve in a lower portion thereof, a resilient nozzle support extending downwardly therefrom, a spreader nozzle entirely supported by the lower portion of said resilient support, and a flexible member secured around said nozzle to depend below said nozzle.

2. A motor road vehicle sander, comprising a sand receptacle having a valve opening therein, a valve mounted in said opening, a resilient annular member secured below said opening, a rigid spreader nozzle connected to the lower end of said resilient member to be entirely supported thereby, and a boot of resilient material secured to said nozzle and depending below the lower end thereof.

3. A sander for motor road vehicles, comprising a sand container having an opening in a lower side thereof, a housing mounted to extend downwardly therefrom, a valve mounted to control the flow of sand downwardly therethrough, nozzle support member mounted on the lower end of said housing and having an opening therein, normally eccentrically disposed with respect to said housing, a nozzle secured below said eccentric opening to direct sand passing therethrough downwardly, and means for rotatably adjusting the relative position of said nozzle support member and said nozzle with respect to said housing.

4. In a sander for motor road vehicles, a sand container having an opening therein, a valve mounted to control a flow of sand through said opening, a spreader nozzle mounted below said opening to direct sand passing through said opening downwardly through said nozzle, and means adjustably mounted in said nozzle in the path of a stream of sand particles therethrough to divide said stream laterally in front of a double wheel of a vehicle upon which the device is adapted to be mounted.

5. In a sander for road vehicles, an outwardly flaring discharge nozzle having a bead surrounding said nozzle in upwardly spaced relation from the lower edge thereof, a resilient boot of relatively stiff material having the upper edge thereof of a size to resiliently engage said bead to hold said boot in position thereon, the sides of said boot having a divergence greater than that of the sides of said nozzle, and the lower end of said boot extending below the lower edge of said nozzle.

6. In a sander for road vehicles, an outwardly flaring discharge nozzle, an inverted V-shaped plate of resilient material mounted therein to divide a stream of sand falling therethrough, a wedge mounted between the sides of said inverted V-shaped element, and adjustable means connected to said wedge to adjustably control the divergence of the sides of said inverted V-element.

7. A sander for vehicles, comprising a sand supply box, a sand distributing conduit leading from said box and adapted to be situated ahead of a double-tired rear wheel of a vehicle, a valve in said conduit, controlling the distribution of sand therethrough, a divider in said conduit to divide the stream of sand to direct a portion thereof in front of each tire of said double-tired wheel, and an outwardly flaring, oval, rubber shield surrounding said dividing element, said shield having its major axis positioned transversely to the longitudinal axis of a motor vehicle on which the device is mounted, the lower edge of said rubber shield being free for unsupported resilient movement.

RUE R. ELSTON.